W. W. STEPHENS.
POWER TRANSMISSION DEVICE.
APPLICATION FILED SEPT. 16, 1915.

1,222,336.

Patented Apr. 10, 1917.

Inventor:
Wiley W. Stephens
By Gillem & Gillem, Attys.

UNITED STATES PATENT OFFICE.

WILEY W. STEPHENS, OF AURORA, ILLINOIS, ASSIGNOR TO STEPHENS-ADAMSON MFG. CO., A CORPORATION OF ILLINOIS.

POWER-TRANSMISSION DEVICE.

1,222,336.        Specification of Letters Patent.        Patented Apr. 10, 1917.

Application filed September 16, 1915. Serial No. 50,967.

*To all whom it may concern:*

Be it known that I, WILEY W. STEPHENS, a citizen of the United States, and resident of Aurora, county of Kane, and State of Illinois, have invented certain new and useful Improvements in Power-Transmission Devices, of which the following is a specification, and which are illustrated in the accompanying drawings, forming a part thereof.

The invention relates to mechanism for the transmission of the power of motor vehicles for the operation of other machinery. Inasmuch as motor vehicles are designed primarily for the use of the generated power in propelling the vehicle along the road, it follows that when the power of the vehicle is to be employed for other purposes it will be most conveniently and efficiently transmitted from the vehicle wheels and to a device which supports the vehicle through said wheels to the same extent and in the same manner as the vehicle is supported by the engagement of the wheels with the road. The present invention accordingly contemplates a power transmission device which is constructed for engagement by the power driven wheels of a motor vehicle in a manner to receive the same proportion of the weight of the vehicle as is carried by said wheels when employed for propelling the vehicle during the ordinary use of the same. The object of the invention is to provide a mechanism which shall be of simple construction and operative for transmitting the full amount of power which the vehicle motor is designed to produce. The particular construction illustrated also possesses the further characteristics of being conveniently portable and easily brought into operative relation with the vehicle wheels.

Figure 1:
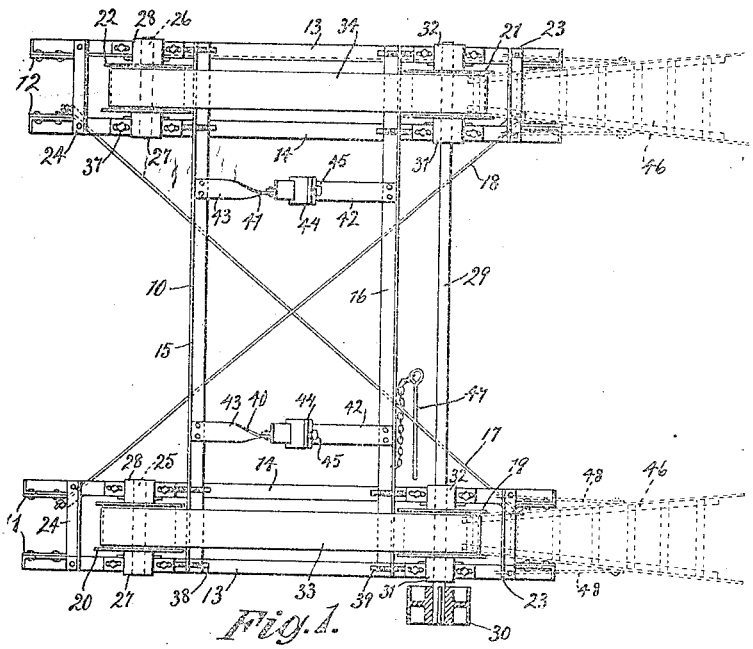
Figure 2:
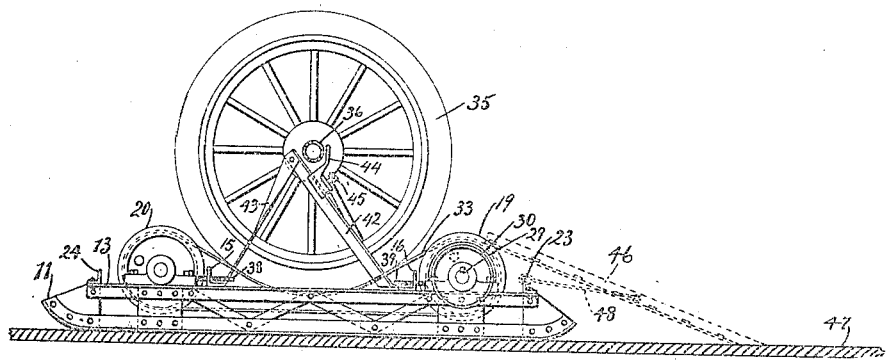
Figure 3:
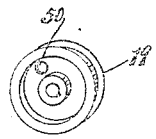

In the accompanying drawings,

Figure 1 is a plan view showing a form of power transmitting device provided by the invention, with aprons or runways provided for guiding the vehicle wheels into operative position indicated by dotted lines, Fig. 2 is a side elevation of the same, one of the vehicle wheels being shown in operative position and the vehicle axle being shown in cross section, and Fig. 3 is a detail side view of one of the pulleys.

As it is preferred that the device should be portable to readily permit of its use at different places, as for example at different points about a farm or in operative relation with different machines in a shop, the frame, 10, may be so constructed as to take the general form of a sled with runners 11 and 12. These runners are desirably rounded at both ends to permit the device to be drawn in either direction. A compact and rigid construction is obtained if each runner 11, 12, is composed of a pair of side frames 13, 14 and the two runners are connected by transverse frame members, as 15, 16, and diagonal brace rods 17, 18. The side frames 13, 14 of each runner 11, 12, are suitably spaced apart to receive pulleys, as 19, 20, and 21, 22, between them, and the lengths of the transverse frame members 15, 16, and diagonal brace rods 17, 18 are such that the spacing of the two sets of pulleys is the same as that of the rear wheels of a motor vehicle. The construction is further strengthened by connecting the two side frames 13, 14 at each side with tie plates 23, 24, one adjacent each end.

The pulleys 20 and 21 are most conveniently mounted on short shafts, as 25 and 26. Each of these shafts has its ends journaled in bearing blocks 27, 28, mounted on the two side frames 13, 14 of the corresponding runner 11, 12. The pulleys 19 and 21, on the other hand, are preferably mounted on a common transverse shaft, as 29. The shaft 29 extends throughout the entire width of the frame 10, and preferably projects beyond the frame at one side where it is equipped with a suitable power transmitting element, as the belt pulley 30. Bearings 31, 32, mounted on the side frames 13, 14 of each runner 11, 12 provide supports for the shaft 29 adjacent each end.

In the preferred form of construction shown, belts 33 and 34 extend between and connect the pulleys 19, 20 and 21, 22, respectively. When these belts are employed the two pulleys, as 19, 20 and 21, 22, over which each belt turns, are separated a sufficient distance to permit the upper length of the corresponding belt to support one of the power driven wheels, as 35, of a motor vehicle without direct engagement of the vehicle wheel with either pulley. To permit a proper tensioning of the belts being maintained for this purpose, provision is made for adjusting the bearings, as 27, 28, and 31, 32, of the several pulleys 19, 20, 21 and 22. As shown each of the bearings 27, 28 and 31, 32, has a bolt and slot connection 37 with the side frames 13, 14 upon which it is mounted and an adjusting screw 38 or 39 is extended through the adjacent transverse frame members 15, 16, to react upon each bearing.

In order that the vehicle wheels, as 35, may not be displaced upon the belts 33, 34, a locking device is desirably provided for engagement with the vehicle axle, as 36. To this end a pair of frames 40 and 41, each comprising a pair of inclined members 42, 43, connected at the top, rise from the transverse frame members 15, 16, at opposite sides of the center line of the machine. These frames desirably extend to a suitable height to serve as a stop for limiting the movement of the vehicle with reference to the frame 10 in one direction. Furthermore, a clip 44, applied to the inclined member 42 of each of the said upright frames, serves to prevent displacement of the vehicle in the other direction. As shown, each clip, 44, is slidingly mounted upon the corresponding inclined member 42, and is secured in adjusted position thereon by means of a clamping screw 45. When the vehicle wheels, as 35, have been positioned upon the belts, 33, 34, each clip 44 is moved to a position in which it projects upwardly in front of the vehicle axle, as 36.

The vehicle wheels, as 35, are most conveniently brought into engagement with the belts 33, 34, by backward movement of the vehicle, the rear wheels, as 35, thereby entering upon the belts 33, 34, from one end. For this purpose suitable planking forming an inclined apron or runway 46, in line with each of the belts 33, 34, is provided for raising the vehicle wheels from the floor or ground, as 47, during the said backward movement of the vehicle. Preferably each apron or runway 46 is detachably connected with the frame 10, as by links 48 having hooked ends for engagement with the openings in the corresponding tie-plate 23.

When the vehicle wheels, as 35, are positioned upon the belts 33, 34, the pulley 30 may be driven at a variety of different speeds, and in either direction, by a suitable operation of the vehicle motor and its controlling and gear-shifting appurtenances. Power for any desired use is thus made available, and is readily transmitted to the part to be driven by the application of a belt (not shown) to the pulley 30. When the power is no longer desired, the vehicle wheels, as 35, are readily disengaged from the belts 33, 34, if the clips 44 are first lowered out of the path of the vehicle axle, as 36, and the vehicle wheels then driven in a forward direction while the belts 33 and 34 are held against movement. As any device for preventing rotation of one of the pulleys 19, 21, will serve to hold both of the belts 33 and 34 against movement, a pin 49, adapted to be inserted through an opening 50 in the pulley 20, is provided for this purpose.

The form imparted to the frame 10 renders it both light and strong, and readily transportable from place to place by being drawn about upon the floor or ground after the manner of drawing a sled. Inasmuch as the vehicle wheels, as 35, are directly supported by belts 33, 34, while the vehicle wheels, in turn, support the vehicle body (not shown) in the same manner as when engaged with the road during the ordinary use of the vehicle, the apparatus serves for transmitting substantially the same amount of power as the vehicle motor provides for propelling the vehicle.

I claim as my invention—

1. In a power transmission device, in combination, a portable frame constructed in the form of a sled with each of its runners comprising a pair of rigidly connected laterally separated side members, a set of connected pulleys mounted between the two side members of each runner to serve as a table for supporting one of the power-driven wheels of a motor vehicle and to be driven by the rotation of the wheel thus supported, a power transmitting wheel carried by the frame, operative connection between the pulleys of both of the said sets and the power transmitting wheel, and a clamp carried by the frame for engagement with a part of a motor vehicle when its power driven wheels are supported by the pulleys.

2. In a power transmission device, in combination, a portable frame constructed in the form of a sled with each of its runners comprising a pair of rigidly connected laterally separated side members, pulleys supported between the two side members of each runner adjacent its opposite ends, a belt turning over the pulleys in each runner and extending in horizontal lengths between said pulleys, a shaft extending transversely through the frame and connecting one of the pulleys in one runner with one of the pulleys in the other runner, and a power transmitting wheel mounted on said shaft.

WILEY W. STEPHENS.